United States Patent
Goodlad et al.

(10) Patent No.: US 10,174,865 B2
(45) Date of Patent: Jan. 8, 2019

(54) TOWABLE SUBSEA OIL AND GAS PRODUCTION SYSTEMS

(71) Applicant: Subsea 7 Limited, Sutton (GB)

(72) Inventors: Martin Alexander Goodlad, Stonehaven (GB); Keith Scott Garden, Inverurie (GB); Robert Dicken, Aberdeen (GB)

(73) Assignee: Subsea 7 Limited, Sutton (GB)

(*) Notice: Subject to any disclaimer, the term of this patent is extended or adjusted under 35 U.S.C. 154(b) by 0 days.

(21) Appl. No.: 15/323,053

(22) PCT Filed: Jul. 2, 2015

(86) PCT No.: PCT/GB2015/051941
§ 371 (c)(1),
(2) Date: Dec. 29, 2016

(87) PCT Pub. No.: WO2016/001680
PCT Pub. Date: Jan. 7, 2016

(65) Prior Publication Data
US 2017/0146152 A1    May 25, 2017

(30) Foreign Application Priority Data
Jul. 4, 2014  (GB) .................................. 1412005.9

(51) Int. Cl.
*F16L 1/16* (2006.01)
*F16L 1/24* (2006.01)
*F16L 9/19* (2006.01)

(52) U.S. Cl.
CPC .............. *F16L 1/163* (2013.01); *F16L 1/165* (2013.01); *F16L 1/24* (2013.01); *F16L 9/19* (2013.01); *F16L 9/20* (2013.01)

(58) Field of Classification Search
CPC ... F16L 1/163; F16L 1/165; F16L 1/24; F16L 9/19
See application file for complete search history.

(56) References Cited

U.S. PATENT DOCUMENTS

| 3,086,369 A | 4/1963 | Brown |
| 3,273,346 A * | 9/1966 | Delaruelle .............. F16L 1/163 |
| | | 405/166 |

(Continued)

FOREIGN PATENT DOCUMENTS

| EP | 0 336 492 | 10/1989 |
| GB | 2 267 945 | 12/1993 |

(Continued)

OTHER PUBLICATIONS

Magma Global Fact Sheet, "Lightweight Riser Design Approach With M-Pipe," Magma Global Ltd., 2016.

(Continued)

*Primary Examiner* — Benjamin F Fiorello
(74) *Attorney, Agent, or Firm* — Levy & Grandinetti

(57) ABSTRACT

A towable pipeline bundle for installation underwater at a subsea oil or gas production site has two or more bundled elongate elements, at least one of which is a flowline for carrying production fluid along the bundle. A rigid buoyancy pipe of polymer-composite material extends along and supports the bundled elongate elements. The buoyancy pipe has an internal buoyancy chamber and at least one port for introducing fluid into the buoyancy chamber. The buoyancy pipe is arranged to have positive buoyancy in seawater when its buoyancy chamber contains a fluid less dense than seawater. In this way, the buoyancy pipe confers substantially neutral buoyancy on a towable unit comprising the bundle. The unit can then be towed in mid-water to the production site and lowered there onto the seabed.

18 Claims, 5 Drawing Sheets

(56) References Cited

U.S. PATENT DOCUMENTS

| | | | | |
|---|---|---|---|---|
| 3,425,453 A * | 2/1969 | Forney | ............... | F16L 9/18 138/111 |
| 3,526,086 A * | 9/1970 | Morgan | ............... | F16L 9/18 138/111 |
| 3,568,456 A | 3/1971 | van Loenen | | |
| 4,120,168 A * | 10/1978 | Lamy | ............... | F16L 1/14 138/111 |
| 4,121,529 A * | 10/1978 | Smith | ............... | F16L 1/163 114/267 |
| 4,135,844 A * | 1/1979 | Lamy | ............... | F16L 1/163 405/171 |
| 4,191,494 A * | 3/1980 | Nakamura | ............... | F16L 1/165 137/116.5 |
| 4,363,566 A | 12/1982 | Morton | | |
| 4,786,088 A * | 11/1988 | Ziu | ............... | F16L 7/00 138/113 |
| 6,003,559 A * | 12/1999 | Baker | ............... | F16L 59/12 138/108 |
| 6,267,537 B1 * | 7/2001 | Breivik | ............... | E21B 17/015 166/350 |
| 6,571,832 B1 * | 6/2003 | Elliott | ............... | F16L 7/00 138/108 |
| 6,682,266 B2 * | 1/2004 | Karal | ............... | B63B 21/502 114/264 |
| 8,206,531 B2 | 6/2012 | Portoles | | |
| 2005/0277347 A1 | 12/2005 | Quigley et al. | | |

FOREIGN PATENT DOCUMENTS

| | | |
|---|---|---|
| GB | 2 377 001 | 12/2002 |
| GB | 2 426 496 | 11/2006 |
| NL | 7805984 | 12/1979 |
| WO | WO 2014/023943 | 2/2014 |

OTHER PUBLICATIONS

Airborne Oil & Gas, "TCP Flowline," Airborne Oil & Gas B.V., 2017.

* cited by examiner

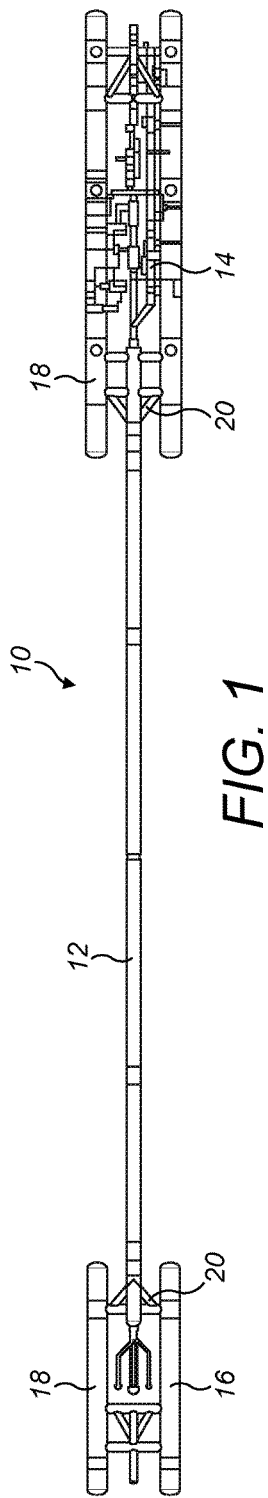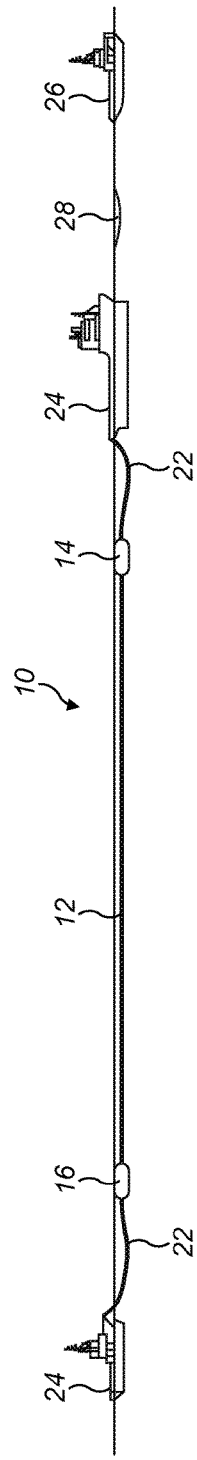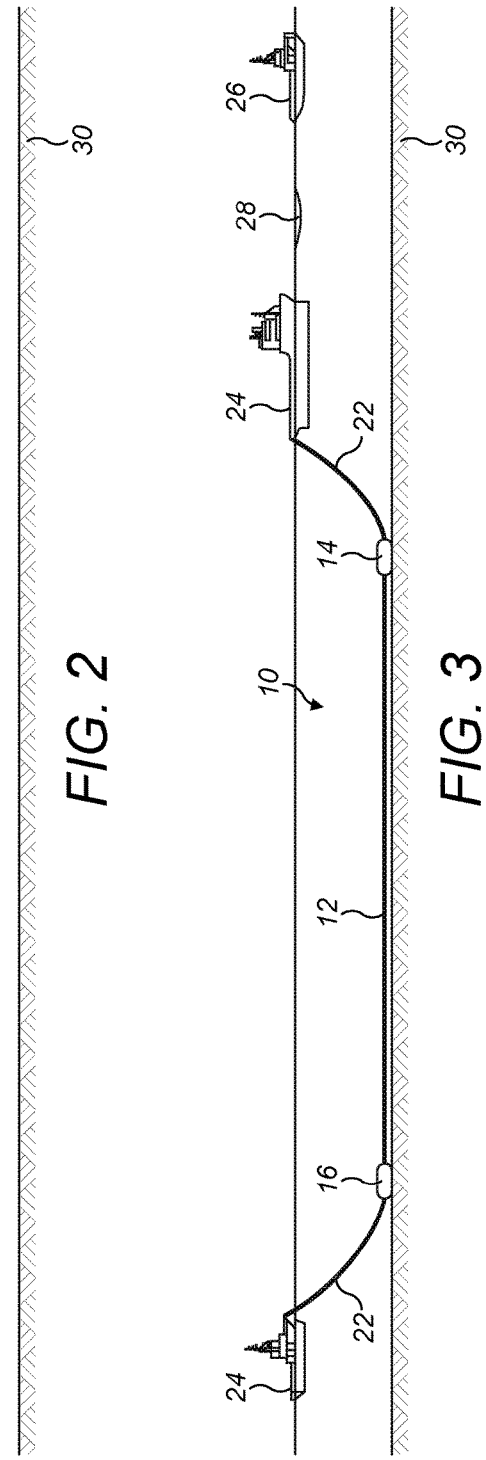

TOWABLE SUBSEA OIL AND GAS PRODUCTION SYSTEMS

This invention relates to towable production systems for use in offshore oil and gas production, and in particular to structures for contributing buoyancy, protection and rigidity to such systems.

In offshore oil and gas production, multi-phase production fluid comprising crude oil and/or natural gas must be transported from subsea wellheads to the surface. For this purpose, the production fluid flows along subsea pipelines comprising flowlines or 'tie-backs' on the seabed and riser pipes extending upwardly from the seabed. At the surface, the production fluid typically undergoes treatment and temporary storage at a surface facility such as a platform or a floating production, storage and offloading vessel (FPSO).

Rigid subsea flowline pipes are most commonly of carbon steel. Steel pipes are coated with a corrosion-resistant external coating such as fusion-bonded epoxy for protection against seawater. Flowline pipes of steel may also be lined with corrosion-resistant liners to protect the pipe from corrosive agents in the production fluid. Also, to reduce heat loss from the production fluid, flowlines may also be coated with thermal insulation or may be arranged as the inner pipe of a pipe-in-pipe (PiP) system.

Subsea flowlines often extend over long distances between wellheads and surface facilities, for example between 1 and 50 kilometers. There is a trend toward even longer flowlines as oil and gas production extends into deeper and more challenging waters. Similarly, subsea flowlines may extend over long distances between two distant subsea structures or between two distant surface facilities via pipeline sections laid on the seabed.

Reciprocally, other fluids must be conveyed over similar distances from the surface facility to the wellheads, an example being pressurised water for injection into subterranean formations to enhance the recovery of crude oil. Such fluids require additional pipes, which follow a path that is generally parallel to the main flowline. Other elongate elements of a subsea production installation follow similar generally parallel paths, such as: copper and fibre-optic cables for supplying electrical power and for carrying data; umbilicals; and service fluid tubing.

It is well known to simplify the subsea installation of multiple elongate elements by grouping them together as bundles in which they are transported and installed together. For example, pipes, cables and umbilicals may be bundled together by a series of transverse frames or supports, with the largest pipe or pipes acting as a core or backbone that supports the other elements of the bundle. In another arrangement, pipes, cables and umbilicals may be bundled and enclosed within a steel carrier pipe. The carrier pipe contributes structural stiffness and isolates the pipes from the surrounding seawater, thereby adding to protection against corrosion and also to insulation against heat loss from the production fluid.

Conventionally, bundles are installed by pulling the elements from a static winch installed onshore or on an anchored barge, or by towing the elements behind a moving towing vessel such as a tug.

U.S. Pat. No. 3,568,456 describes a pipeline installation procedure involving towing. A pipeline or bundle section is assembled onshore or in an area of sheltered water. Buoys are attached to the pipeline or bundle section to provide buoyancy. The pipeline or bundle section is then towed to an installation site and lowered onto the seabed.

A pipeline or bundle section may be towed at various depths in water. The choice of depth involves a trade-off between various factors. Towing at or near the surface is easiest to manage, but surface water dynamics generate fatigue in the pipeline or bundle section. Indeed, for conventional bundle arrangements, fatigue is the limiting factor that determines the allowable tow distance.

Towing near the seabed protects the pipeline or bundle section from the influence of surface water dynamics and limits risks during subsequent lowering to the seabed at the installation site. However, such 'bottom-towing' is only feasible if the contours of the seabed permit.

Mid-water towing is a good compromise that ensures low-stress installation without the use of large crane vessels that depend on low sea states. This makes installation less weather-sensitive and reduces the cost of installation vessels significantly. However, mid-water towing requires precise buoyancy management.

A favoured mid-water towing method is known in the art as the 'controlled-depth tow method' or CDTM, as described in U.S. Pat. No. 4,363,566. In CDTM, a pipeline or bundle section is made neutrally buoyant at the required depth by the addition of buoyancy and/or ballast chains spaced along its length. Forward and rearward end structures or towheads of the pipeline or bundle section are tethered respectively to leading and trailing tugs. The speeds of, and spacing between, the tugs is adjusted to maintain the required depth having regard to the effect of drag forces and tension in the tethers.

In CDTM operations, the shape and bending of the pipeline or bundle section can be difficult to control because of variations in buoyancy along its length. In an effort to counteract this, GB 2426496 discloses methods for imparting a reverse-catenary shape to a pipeline or bundle section for towing in mid-water.

A towhead for a flowline bundle installed by CDTM is described in OTC 6430 (*OTC Conference*, 1990). The towhead includes valves, connectors and manifolds to connect to a wellhead or to wellhead jumpers; so, in effect, the towhead is a combination of a conventional PLET, manifold and towhead. A similar arrangement is disclosed in EP 0336492.

Integrating bundles and towheads allows the system to be prefabricated, assembled and tested onshore or in sheltered water before towing to the field for installation. This improves the reliability of the system, as compared with connecting units at a subsea location and performing tests there instead. Reducing the number of subsea-connected interfaces also improves reliability.

Whilst the design and installation of pipeline bundles is well known, the performance and length of such bundles is limited. For example, deeper sites require the wall thickness of an outer carrier pipe to be increased to resist hydrostatic pressure, which increases the weight of the bundle. Also, self-evidently, longer bundles tend to be heavier because, for a given configuration, weight increases with length. As a result, the overall weight of a bundle can exceed the bollard pull performance of even the most powerful available tug. In that event, multiple tugs must be used in parallel to tow the bundle, which generates additional hazards.

The conventional approach to reduce the overall apparent weight of a bundle for towing is to use an arrangement of buoys to add buoyancy to the bundle. However, the heavier the bundle, the larger or more numerous and hence the more expensive the buoys. Also, larger or more numerous buoys are more challenging to release when landing the bundle on the seabed.

Another way to add buoyancy to a bundle is to use an additional buoyant carrier pipe of steel, which may be attached to an outer carrier pipe of the bundle or directly to the bundle itself in the absence of an outer carrier pipe. It is also possible for a carrier pipe to be filled with gas or kerosene, as taught by NL 7805984 and GB 2377001. A drawback of this approach is the difficulty of safely flooding, uncoupling and retrieving the full length of the carrier pipe.

In summary, therefore, towed subsea production systems currently use a steel pipe to contribute buoyancy and structural integrity. Specifically, the steel pipe provides buoyancy that enables the system to be towed to an installation site. The steel pipe also absorbs the loads that the system will experience during towing and installation.

In more distant prior art, US 2005/0277347 discloses a pipeline bundle in which a relatively light flowline is coupled to a buoyancy tube into which a dense buoyancy control material is injected to achieve a desired buoyancy, to sink the flowline in a controlled manner. This sits in contrast with the arrangements noted above in that the buoyancy tube is used to add weight to a buoyant flowline. A similar approach is disclosed in U.S. Pat. No. 3,086,369, in which a bundle of metal pipes is sunk by filling one of the pipes with ballast.

The bundle disclosed in US 2005/0277347 is arranged for reel-lay and so is not towable in the sense that it would not be suitable for towing over a distance of potentially many miles from an onshore or sheltered assembly point to an installation field.

Against this background, the present invention has been devised to satisfy a continuing need for longer pipeline bundles that are suitable for deeper water.

In one sense, the invention resides in a towable pipeline bundle for installation underwater at a subsea oil or gas production site, the bundle comprising:
two or more elongate elements bundled in parallel relation;
at least one rigid buoyancy pipe extending along and supporting said bundled flowlines, which buoyancy pipe has an internal buoyancy chamber and at least one port for introducing fluid into the buoyancy chamber; and
wherein the buoyancy pipe is of polymer-composite material and is arranged to have positive buoyancy in seawater when its buoyancy chamber contains a fluid less dense than seawater.

For example, the rigid buoyancy pipe may extend generally parallel to or extend around and along the bundled elongate elements.

The bundle further comprises one or more spacer frames supporting and locating the flowlines relative to the buoyancy pipe, and spacing the flowlines from each other, the or each spacer frame being attached to and extending transversely from or within the buoyancy pipe.

At least one of the bundled flowlines may have a pipe-in-pipe arrangement. Also, the bundle may further comprise a power and/or data line for conveying power or data along the bundle.

In one variant, the buoyancy pipe surrounds the bundled flowlines as a carrier pipe. In that case, an endpiece, end wall or side wall of the buoyancy pipe may be penetrated by the bundled flowlines within the buoyancy pipe or by connections leading to the bundled flowlines within the buoyancy pipe.

In another variant, the buoyancy pipe lies beside the bundled flowlines as a backbone pipe or a core pipe. For example, the buoyancy pipe may lie between the bundled flowlines as a core pipe.

The buoyancy chamber suitably contains pressurised air that serves as the fluid less dense than seawater.

At least one of the ports may penetrate a side wall of the buoyancy pipe, or at least one of the ports may penetrate an endpiece that closes an end of the buoyancy pipe.

The buoyancy pipe may be terminated by at least one end wall of polymer-composite material that is integral with or bonded to a side wall of the buoyancy pipe.

The inventive concept embraces a towable unit comprising the bundle of the invention attached to at least one towhead, and a subsea installation comprising the bundle of the invention. In such a towable unit, the buoyancy pipe is preferably anchored to the towhead to provide a load path between the buoyancy pipe and the towhead, enabling the bundled elongate elements to be decoupled from that load path.

The inventive concept extends to a method of installing a towable pipeline unit underwater at a subsea oil or gas production site, the method comprising:
using a rigid polymer-composite buoyancy pipe of the unit to support bundled flowlines of the unit for carrying production fluid, the flowlines being supported and located relative to the buoyancy pipe, and spaced from each other, by one or more spacer frames attached to and extending transversely from or within the buoyancy pipe;
introducing a fluid less dense than seawater into an internal buoyancy chamber of the buoyancy pipe to confer substantially neutral buoyancy on the unit at a towing depth in seawater;
towing the unit to the production site at the towing depth; and
lowering the unit onto the seabed at the production site.

Auxiliary buoyancy may be applied to one or more towheads at one or both ends of the buoyancy pipe. The unit may be lowered to the seabed by replacing at least some of the fluid in the buoyancy chamber with a denser fluid. For example, the buoyancy chamber may be fully or partially filled with seawater or a heavier-than-seawater fluid, or external ballast may be applied to the buoyancy pipe.

In summary, therefore, the invention resides in the use of a rigid polymer-based composite pipe as a light structural and buoyant part of a bundle. Such a pipe has a wall structure composed of reinforcing fibres of, for example, glass, aramid or carbon embedded within a resin matrix. Polymeric composite material is lighter than steel but is stiff and strong enough to withstand the loads of hydrostatic pressure, bending and installation. In addition, polymeric composite material is less fatigue-sensitive than steel and has greater resistance to corrosion in seawater.

The polymeric composite pipe of the invention can fulfil the function of a steel carrier pipe, namely to add structural stiffness and protection to the bundle, in combination with the additional functions of reducing the weight of the bundle and contributing buoyancy to the bundle for towing.

The polymeric composite pipe is preferably an outer carrier pipe of a bundle. However, if a bundle has no outer carrier pipe, a polymeric composite pipe may be added to the bundle as a flotation pipe and as a rigid backbone, for example as a core pipe.

Whilst steel pipelines may be terminated simply by welding steel bulkheads to the ends, the ends of a polymeric composite carrier pipe are designed differently; end-fittings have to be specifically designed and joined to the composite material. The technical challenges of ensuring a fluid-tight interface between a steel fitting and a rigid composite pipe are discussed in WO 2014/023943.

The use of a composite outer pipe is known in PiP systems, for example as disclosed in U.S. Pat. No. 8,206,531. The function of the composite outer pipe in a PiP system is to resist installation loads, for example arising from reel-lay, and to ensure a dry annulus around the inner flowline to enhance thermal insulation performance. For this purpose, the narrow annulus between the outer pipe and the inner pipe is generally filled with thermal insulation material and does not provide a reserve of buoyancy.

The invention requires more internal space than in a PiP system within a polymeric composite pipe to ensure buoyancy during towing. The function of the polymeric composite buoyancy pipe is to provide buoyancy and to resist loads experienced during towing and installation. Indeed, a buoyancy pipe that surrounds flowlines or an inner bundle in a towed production system may be flooded upon installation to achieve on-bottom stability.

Other composite pipe solutions are known but they are not suitable for use in pipeline bundles. One example is a conventional flexible steel pipe made of layers of metallic and polymer materials. Flexible pipes are not rigid enough to contain or to provide effective support to one or more rigid pipes as required by the invention. Also, known flexible pipes cannot withstand high hydrostatic pressure if their inner diameter is greater than about 20" (approximately 500 mm). In any event, flexible pipes are far more expensive than other solutions.

Those skilled in the art clearly understand the meaning of 'flexible' in the context of fluid-carrying conduits such as risers; they also understand the distinction between flexible and rigid conduits.

Specifically, the terms 'flexible' and 'rigid' have clear meanings in the subsea oil and gas industry that differ in important respects from general language and indeed from the strictest meaning of those terms. In particular, despite their names, flexible pipes are not fully flexible beyond the limit of bending strain; nor are rigid pipes devoid of flexibility.

Flexible pipes used in the subsea oil and gas industry are specified in API (American Petroleum Institute) Specification 17J and API Recommended Practice 17B. The pipe body is composed of a composite structure of layered materials, in which each layer has its own function. Typically, polymer tubes and wraps ensure fluid-tightness and thermal insulation. Conversely, steel layers or elements provide mechanical strength; for example, interlocked steel tapes form a carcass or pressure vault and a tensile armour is formed of helically-wound wire. Flexible pipes are terminated and assembled by end fittings.

The structure of a flexible pipe allows a large bending deflection without a significant increase in bending stresses. The bending limit of the composite structure is determined by the elastic limit of the outermost plastics layer of the structure, typically the outer sheath, which limit is typically 6% to 7% bending strain. Exceeding that limit causes irreversible damage to the structure. Consequently, the minimum bending radius or MBR of flexible pipe used in the subsea oil and gas industry is typically between 3 and 6 meters.

Rigid pipes used in the subsea oil and gas industry are specified in API Specification 5L and Recommended Practice 1111. In contrast to flexible pipes, a rigid pipe usually consists of or comprises at least one pipe of solid steel or steel alloy. However, additional layers of materials can be added, such as an internal liner layer or an outer coating layer. Such additional layers can comprise polymer, metal or composite material. Rigid pipes are terminated by a bevel or a thread, and are assembled end-to-end by welding or screwing them together.

The allowable in-service deflection of rigid pipe is determined by the elastic limit of steel, which is around 1% bending strain. Exceeding this limit caused plastic deformation of the steel. It follows that the MBR of rigid pipe used in the subsea oil and gas industry is typically around 100 to 300 meters. However, slight plastic deformation can be recovered or rectified by mechanical means, such as straightening. Thus, during reel-lay installation of a rigid pipeline made up of welded rigid pipes, the rigid pipeline can be spooled on a reel with a typical radius of between 8 and 10 meters. This implies a bending strain above 2% for conventional diameters of rigid pipes, requiring the pipe to be straightened mechanically during unreeling.

Polymer composite pipes are not yet specified in standards tailored to the subsea oil and gas industry. Like rigid pipes, polymer composite pipes are substantially rigid and stiff but they can withstand more bending strain than rigid steel pipes; however, they cannot flex like flexible pipes. Thus, 'rigid' should be understood in this document as having characteristics more akin to rigid steel pipe than to flexible pipe. Also, when defining the invention, 'composite' should be understood as 'composite material' and not as 'composite structure', unlike the composite layered structure of a flexible pipe. The invention is concerned with rigid composite pipes, which may also be referred to as composite polymer pipes.

Pipes of non-composite plastics, typically polyethylene tubes, are not stiff enough for the purposes of the invention and provide insufficient resistance to crushing or hoop stress.

Thus, the invention replaces the steel buoyancy pipe of a towable subsea production system with a pipe of a plastics composite material. That pipe may be a carrier pipe disposed around other elements of the bundle or a core pipe or backbone pipe disposed beside other elements of the bundle.

A key advantage of using a composite material for the buoyancy pipe is that its composition and lattice design can be adapted specifically for each project based on the characteristics of the installation site and the design loads. Also, composite buoyancy pipes have substantially greater fatigue resistance than steel buoyancy pipes.

An important material characteristic of a plastics composite buoyancy pipe is its circumferential strength or hoop stress resistance, as the buoyancy pipe is pressurised internally before being lowered and hence most conveniently before being towed.

The laminate structure of a composite material can be designed to withstand both higher internal charging pressures and higher overpressures than a steel pipe. Also, additional layers may be added to the laminate to configure the composite pipe to withstand the axial tensile and compressive forces associated with the launch and the thermal expansion experienced during operation.

The composite buoyancy pipe of the invention is significantly lighter than its steel counterpart. The reduced weight increases the effectiveness of the composite pipe for providing buoyancy, allowing the buoyancy pipe to have a reduced outer diameter for a given net upthrust. Also, being smaller for a given net upthrust, a composite pipe is easier to fill with lighter-than-seawater fluid for buoyancy during towing and to flood with a heavier fluid such as seawater for stability upon installation.

In order that the invention may be more readily understood, reference will now be made, by way of example, to the accompanying drawings in which:

FIG. 1 is a plan view of a pipeline bundle in accordance with the invention;

FIG. 2 is a side view of the bundle of FIG. 1 being surface-towed at or near the surface;

FIG. 3 is a side view of the bundle of FIG. 1 being bottom-towed near the seabed;

Figure 4:
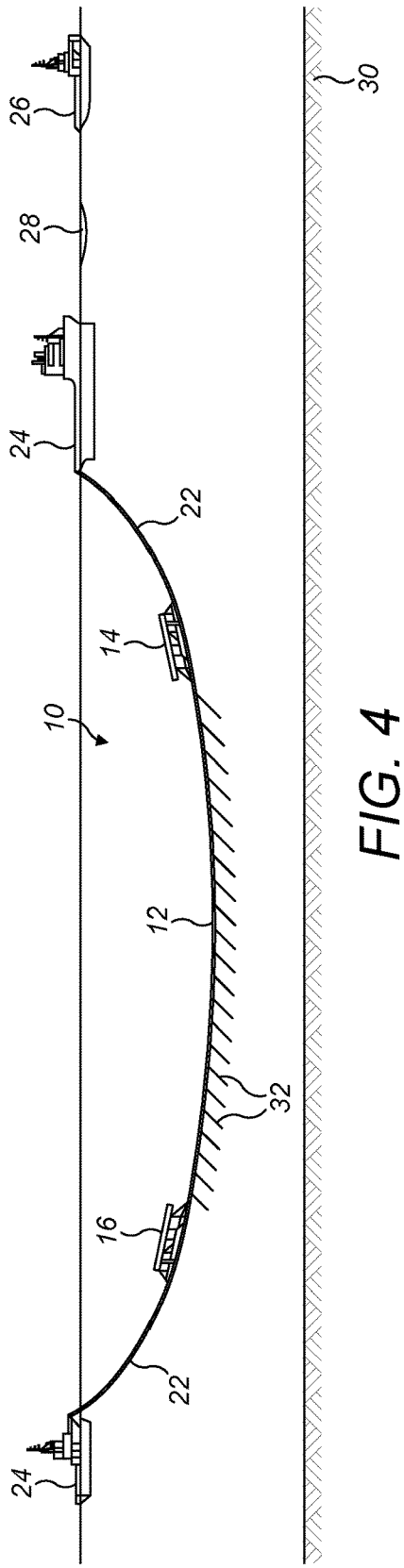
FIG. 4 is a side view of the bundle of FIG. 1 being towed in mid-water using a controlled-depth tow method.

Referring firstly to FIG. 1 of the drawings, a towable unit 10 comprises a long pipeline bundle 12 connecting a leading towhead 14 and a trailing towhead 16. Other than in some mid-water towing arrangements shown in FIGS. 4 and 5, the bundle 12 extends substantially horizontally between the towheads 14, 16.

As will be described below with reference to FIGS. 6, 7 and 8, the bundle 12 comprises two or more elongate elements extending between the towheads 14, 16, at least one of which elements is a rigid flowline for carrying production fluid. The or each rigid flowline may be of steel and/or polymer composite and may be of single-wall or PiP construction.

In accordance with the invention, the bundle 12 further comprises at least one rigid polymer-composite buoyancy pipe serving as a carrier pipe, a backbone pipe or a core pipe that extends parallel to and supports the two or more elongate elements of the bundle 12. The buoyancy pipe is distinct from the elongate elements and may be positioned relative to those elements in various ways as shown in FIGS. 6, 7 and 8.

The bundle 12 is shown in the drawings both interrupted and greatly shortened: in practice, the bundle 12 will extend over a considerable distance between the towheads 14, 16, typically up to 1 km to 2 km.

In this example, each towhead 14, 16 comprises an elongate tubular steel lattice frame 18 of generally rectangular cross-section. At its inward end, each frame 18 has a tapering nose structure 20 to anchor the associated end of the bundle 12 against tensile loads. The composite buoyancy pipe of the bundle 12 may, for example, terminate at steel endpieces inside the towhead frames 18 as will be explained.

The towheads 14, 16 incorporate buoyancy, or provide for buoyancy to be attached, to offset their weight during towing.

Gaps between the structural members of the towhead frames 18 define bays for processing and flow-handling equipment that may be carried by the towheads 14, 16. In particular, the towheads 14, 16 suitably house any infrastructure that may be required to connect flowlines of the bundle 12 into the rest of the subsea production system.

The unit 10 is apt to be fabricated and tested onshore or in sheltered water before being towed to an installation site. If fabricated onshore, the whole unit 10 may be pulled into the water, as is already done for pipe bundles that form hybrid riser towers used in the oil and gas industry.

Figure 11:
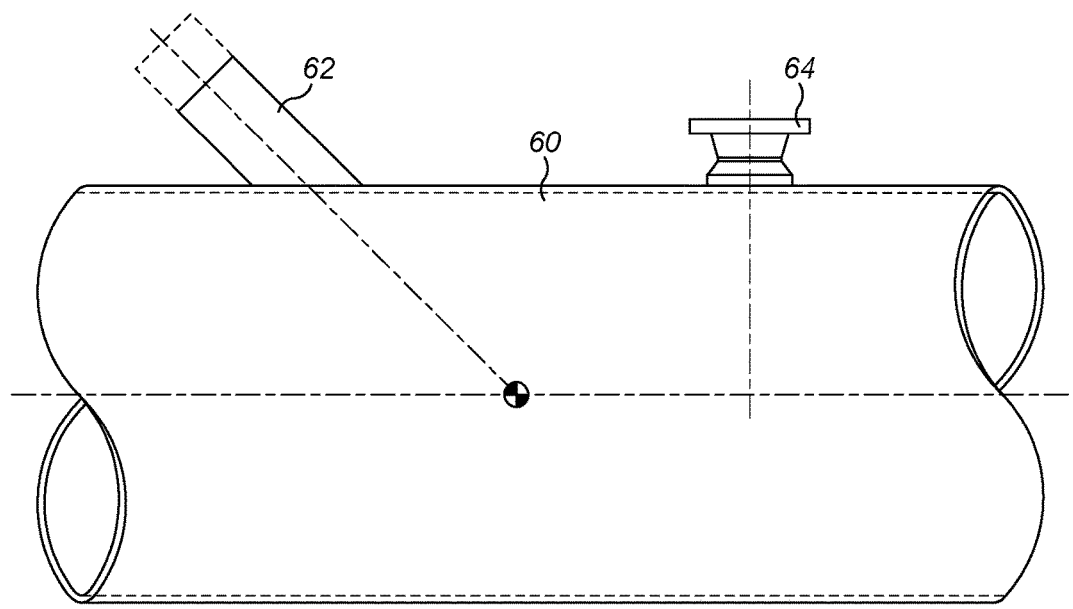
FIG. 11 is a sectional side view of a composite buoyancy pipe showing flooding and venting penetrations through a side wall of the pipe.

Through a suitable fitting as shown in FIG. 11, the hollow interior of the polymer-composite buoyancy pipe of the bundle 12 is filled fully or partially with a fluid that is less dense than the seawater through which the unit 10 will be transported. The hollow interior of the buoyancy pipe therefore serves as a buoyancy chamber that confers positive buoyancy on the buoyancy pipe immersed in seawater when filled to the necessary extent by a lighter-than-seawater fluid such as air. The aim is to ensure that the unit 10 as a whole is substantially neutrally buoyant at a pre-determined water depth for towing. Additional buoys may also be used, especially for supporting the towheads 14, 16.

To prevent collapse due to overpressure, the buoyancy pipe of the bundle 12 is pressurised or charged before towing to a pressure that is substantially equivalent to the hydrostatic pressure at the maximum water depth during installation.

FIGS. 2 to 5 show various towing methods that may be used to transport the unit 10 to an offshore installation site. In each case, the unit 10 is held in tension by lines 22 extending fore and aft from padeye connections on the respective towheads 14, 16 to respective installation vessels, which may be tugs 24. Optionally, a third patrol/survey vessel 26 ahead of the leading tug 24 surveys the route and monitors the towing operation.

The bundle 12 acts in tension between the towheads 14, 16 during towing, with tensile loads being borne principally or exclusively by the pipes of the bundle 12 or by an outer pipe or other protective structure that surrounds the various elongate elements of the bundle 12, as will be explained.

Figure 5:
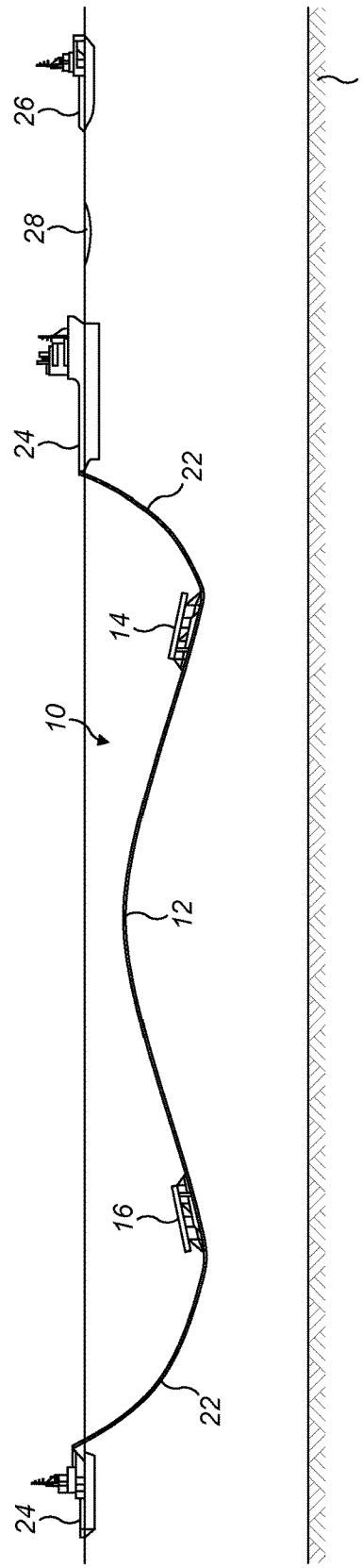
FIG. 5 is a side view of the bundle of FIG. 1 being towed in mid-water as an inverted catenary.

FIG. 2 shows the unit 10 being surface-towed at or near to the surface 28, whereas FIG. 3 shows the unit 10 being bottom-towed near the seabed 30. Conversely, FIGS. 4 and 5 show mid-water towing methods in which the unit 10 is towed at an intermediate depth in the water column between the surface 28 and the seabed 30. Here, the unit 10 is safely clear of the contours of the seabed 30 yet is beneath significant influence from wave action near the surface 28.

Specifically, FIG. 4 shows a CDTM operation in which ballast chains 32 spaced along the bundle 12 add weight that offsets the buoyancy of the bundle 12. The ballast chains 32 may, for example, be attached to the bundle 12 using cargo straps. If required, buoyancy may be added directly to the towheads 14, 16 by attaching buoys or buoyancy modules to them. As an alternative, FIG. 5 shows the unit 10 shaped as an inverted catenary by virtue of ballast weight added to the towheads 14, 16 at the ends of the unit 10 acting against central buoyant upthrust on the bundle 12.

When the unit 10 reaches an installation site, it is lowered toward the seabed 30 while the lines 22 are paid out from the tugs 24. The unit 10 can be lowered to the seabed 30 by flooding the buoyancy pipe of the bundle 12 with seawater, by removing external buoyancy from the unit 10 or by adding ballast to the unit 10. Any of those solutions can be combined, though flooding may be required in any event to ensure on-bottom stability of the unit 10.

The unit 10 settles on the seabed 30 in a predetermined gap in the subsea production system, with an upstream one of the towheads 14, 16 interposed between a wellhead and the bundle 12 and a downstream one of the towheads 14, 16 interposed between the bundle 12 and a riser.

When on the seabed 30 at the installation site, the unit 10 is connected via jumpers or spools at each towhead 14, 16 to other elements of the subsea production system using suitable well-known connectors. Those other elements may be placed on the seabed 30 before or after the unit 10. Jumper pipes or spools may connect the upstream one of the towheads 14, 16 to the wellhead and the downstream one of the towheads 14, 16 to the riser. However, the towheads 14, 16 could be connected to the wider subsea production system in other ways, for example via manifolds, and so need not be connected directly to the wellhead and to the riser.

Figure 6:
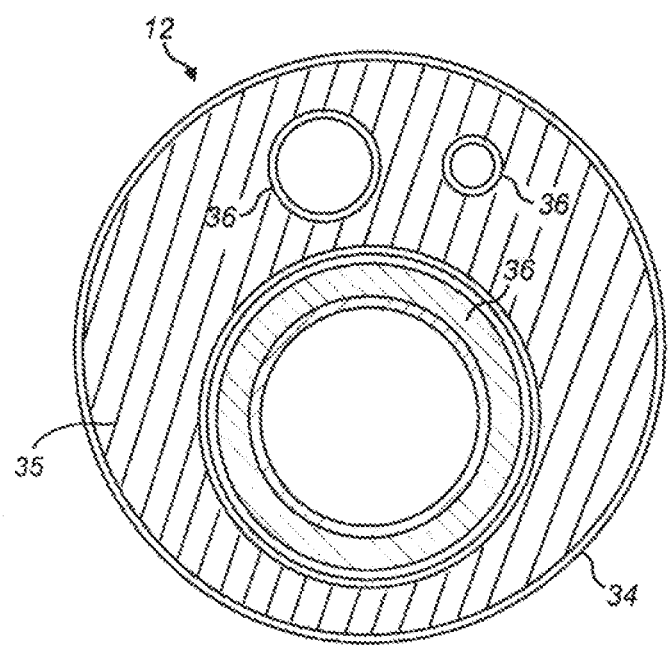
FIG. 6 is a cross-sectional view of a pipeline bundle in which a composite buoyancy pipe is a carrier pipe surrounding other elements of the bundle.
Figure 7:
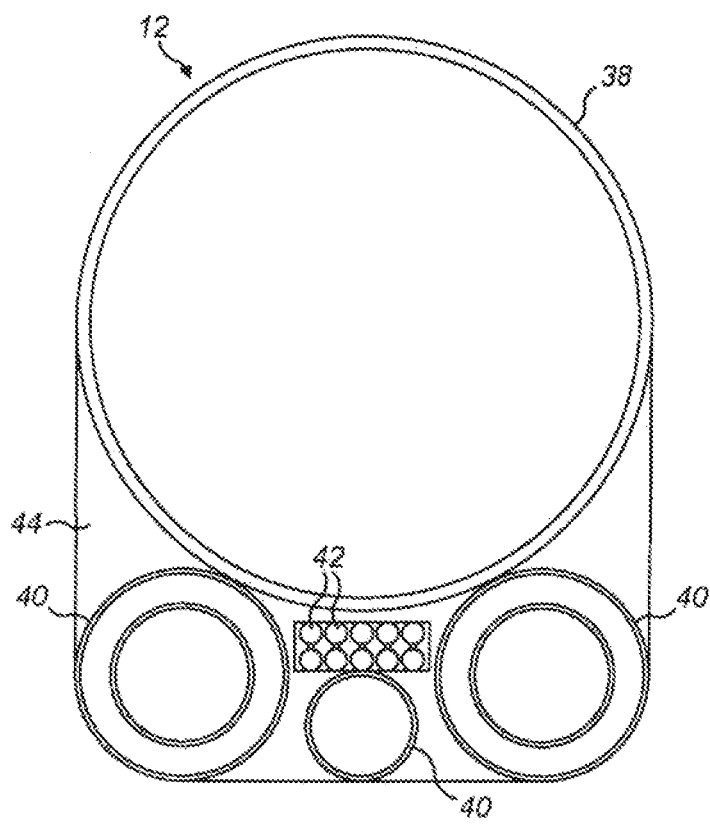
FIG. 7 is a cross-sectional view of a pipeline bundle in which a composite buoyancy pipe is a backbone pipe beside other elements of the bundle.
Figure 8:
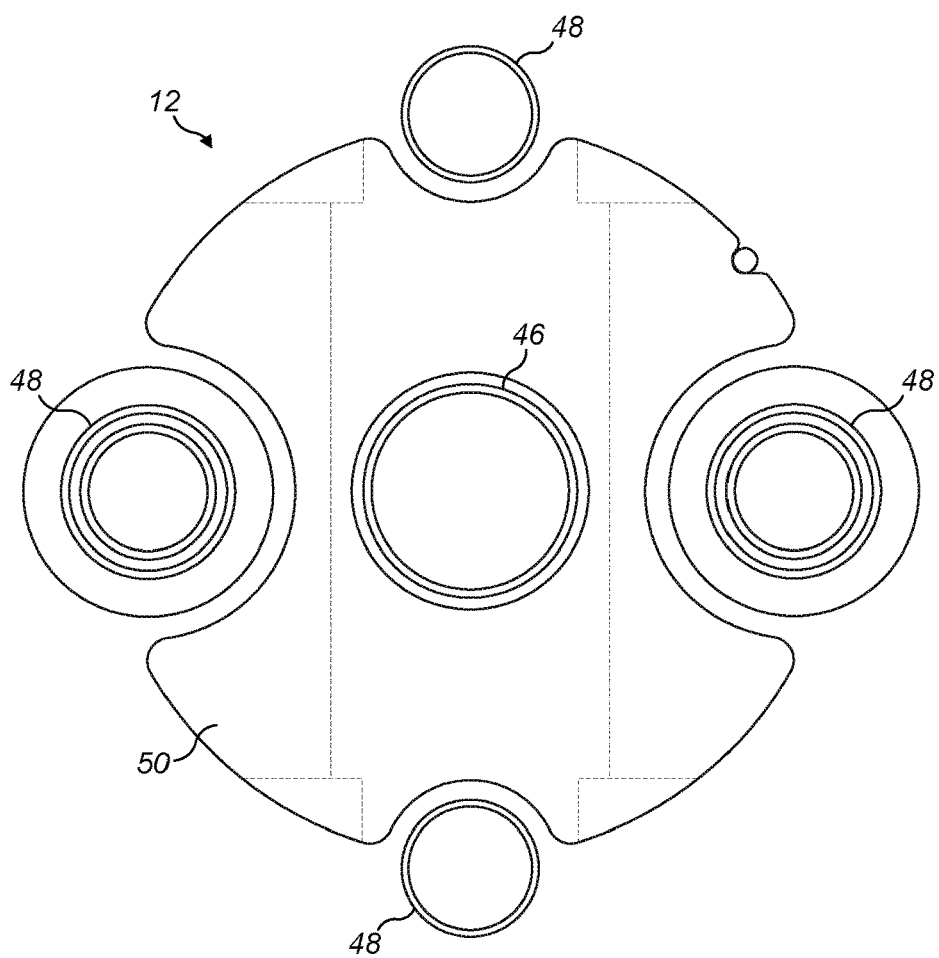
FIG. 8 is a cross-sectional view of a pipeline bundle in which a composite buoyancy pipe is a core pipe surrounded by other elements of the bundle.

Turning next to FIGS. 6, 7 and 8, these show three different options for positioning the composite buoyancy pipe of a bundle 12. In each case, the composite material of the buoyancy pipe may be of various types, such as a composite comprising a matrix of the polymer PEEK by way of example.

FIG. 6 shows a composite buoyancy pipe as a carrier pipe 34 sealed around and surrounding other elongate elements of the bundle 12, namely parallel flowlines 36 that are each under internal fluid pressure. Thus, the flowlines 36 lie within the inner circumference of the circular cross-section of the carrier pipe 34. Spacer frames 35 including formations that retain the flowlines 36 suitably span the internal diameter of 30 the carrier pipe 34 to hold the flowlines 36 in appropriate positions within the carrier pipe 34.

FIG. 7 shows a composite buoyancy pipe as a backbone pipe 38 beside other elongate elements of the bundle 12, namely parallel flowlines 40 that are each under internal fluid pressure and power and control lines 42 that carry electrical power and/or control data along the bundle 12. Thus, there are no flowlines 40 or power or control lines 42 to at least one side of the backbone pipe 38. The flowlines 40 and the power or control lines 42 are spaced and supported by spacer frames 44 distributed along the length of the bundle 12, one of which frames 44 is shown in FIG. 7.

When installation is complete, power umbilicals may extend from a surface unit to one or both of the towheads 14, 16 to supply electrical power to the subsea production system. Advantageously, power may be transmitted from one towhead 14, 16 to the other towhead 14, 16 through the power and control lines 42 in the bundle 12. This allows one umbilical to be connected directly or indirectly to just one of the towheads 14, 16 and yet to provide power to both of the towheads 14, 16. Similarly, a data connection may be made via the power and control lines 42 of the bundle 12 to convey control data between the towheads 14, 16.

The backbone pipe 38 may be positioned below or preferably above the flowlines 40 and the power or control lines 42 as shown in FIG. 7. The arrangement shown in FIG. 7 makes it possible for the backbone pipe 38 to be separated from the other elongate elements 40, 42 and the spacer frames 44 of the bundle 12 after installation, whereupon the backbone pipe 38 may be recovered to the surface for re-use.

FIG. 8 shows a composite buoyancy pipe as a core pipe 46 surrounded by other elements of the bundle 12, namely parallel flowlines 48 that are each under internal fluid pressure. Again, the flowlines 48 are spaced and supported by spacer frames 50 distributed along the length of the bundle 12, one of which frames 50 is shown in FIG. 8.

Where the flowlines 40, 48 are installed outside the buoyancy pipe 38, 46 as shown in FIGS. 7 and 8, the buoyancy pipe 38, 46 may be fitted with lead and trail padeyes at respective ends to ensure that launching and towing loads are transmitted directly through the buoyancy pipe 38, 46 and not the flowlines 40, 48.

Of course, power and control lines as shown in FIG. 7 may also be positioned beside the flowlines inside or outside the carrier pipe 34 or the core pipe 46 in variants of the arrangements shown in FIGS. 6 and 8. It is also possible for some elongate elements to be inside a carrier pipe and for other elongate elements to be outside a carrier pipe. Moving on to FIG. 9, this shows the nose structure 20 of a towhead 14, 16 that transmits towing forces from a padeye connection on the towhead 14, 16 to a composite buoyancy pipe. In this case, the composite buoyancy pipe is a carrier pipe 34 that surrounds flowlines 36 as shown in FIG. 6 and is anchored rigidly to the nose structure 20 of the towhead 14, 16.

Figure 9:
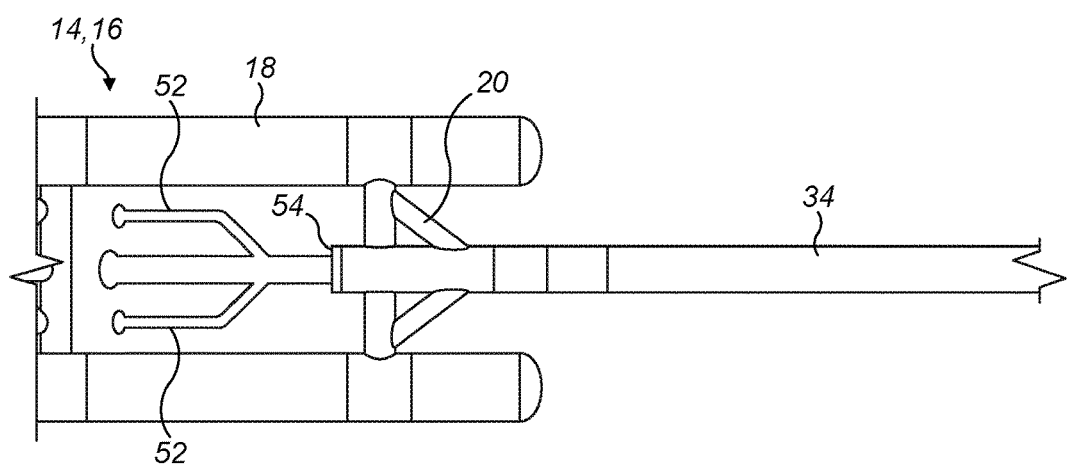
FIG. 9 is an enlarged detail view showing the interface between a towhead and the pipeline bundle in FIG. 1.

FIG. 9 also shows end connections 52 of the flowlines 36. The end connections 52 are attached to and protrude from an endpiece 54 of the carrier pipe 34. The endpiece 54 is also connected to the frame 18 of the towhead 14, 16 and may comprise one or more valves for controlling the flow of fluids through the flowlines 36.

Advantageously, the end connections 52 of the flowlines 36 are not rigidly attached to the towhead 14, 16. This decouples the flowlines 36 from the load path that extends from one towhead 14, 16 to the other through the carrier pipe 34.

Figure 10:
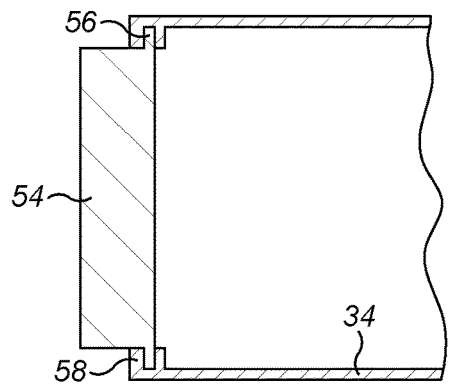
FIG. 10 is an enlarged detail view of a steel endpiece attached to a composite buoyancy pipe serving as a carrier pipe that surrounds other elements of the bundle.

FIG. 10 shows the endpiece 54 connected and sealed to a buoyancy pipe being a carrier pipe 34 that encapsulates the flowlines 36. However, the flowlines 36 are omitted in this simplified schematic view. In this example, the endpiece 54 is a disc forged of steel with a peripheral circumferential flange 56 that extends radially outwardly. The flange 56 engages in a circumferential seal groove 58 that faces radially inwardly around an end of the pipe 34.

It should be noted that the endpiece 54 need only be of steel if the flowlines 36 are also of steel and are welded to the endpiece 54. If flowlines are of a polymer composite or are otherwise attached to the endpiece, then the endpiece can be also be of a polymer composite.

FIG. 11 shows a polymer composite buoyancy pipe 60 with penetrations along its length. Flooding and filling/venting valved fittings 62, 64 and their associated pipes and penetrations are attached by known resin connection methods. In this way, steel pipe and valve assemblies may be bonded directly to the composite buoyancy pipe 60; alternatively, steel connectors may be bonded to the composite buoyancy pipe 60 allowing steel pipes and valves to be coupled to those connectors.

Figure 12:
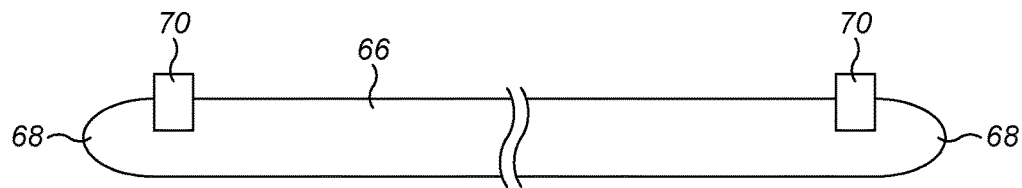
FIG. 12 is a schematic side view showing an alternative end structure for a composite buoyancy pipe.

Finally, FIG. 12 shows an alternative to endpieces connected to ends of a composite pipe, from which end connections of the flowlines protrude as described above. In this variant, a polymer composite pipe 66 is closed by suitably domed or hemispherical composite end walls 68 that are formed integrally with the pipe 66 or bonded onto the pipe 66 during manufacture. In that case, connections 70 to flowlines within the pipe 66 may be inserted laterally through penetrations in side or end walls of the pipe 66 as branches from the flowlines. Again, the connections 70 may comprise steel pipe and valve assemblies bonded directly to the composite buoyancy pipe 66 or steel connectors bonded to the composite buoyancy pipe 66 allowing steel pipes and valves to be coupled to those connectors.

The fabrication of the polymer composite buoyancy pipe and the assembly of the towable unit will differ from that of a steel system. Four options are presently contemplated, depending upon whether the composite buoyancy pipe will be a carrier pipe, backbone pipe or core pipe.

1. The composite buoyancy pipe may be fabricated at a supplier's manufacturing facility in shorter pipe lengths. The pipe lengths are then transported to a fabrication facility for making the towable unit. The lengths of composite buoyancy pipe are joined together into a long length that is then sheathed around the inner bundle of other elongate elements.
2. Composite pipe may be fabricated into a long length at a fabrication facility for making the towable unit. The long length of composite buoyancy pipe is then sheathed around the inner bundle of other elongate elements.
3. The inner bundle of other elongate elements is fabricated at a fabrication facility for making the towable unit. There, the buoyancy pipe is fabricated around the inner bundle in a continuous process moving along the length of the inner bundle.
4. The composite buoyancy pipe, being a backbone pipe or core pipe, is fabricated either onsite at a fabrication facility for making the towable unit or is delivered to that site for assembly. The composite buoyancy pipe is then attached to the bundle of other elongate elements at numerous locations along their length but does not surround the other elongate elements.

Preferably, air is injected at high pressure into the composite buoyancy pipe of the invention as an example of a lighter-than-seawater fluid used to confer positive buoyancy on the pipe for towing. A gel or a light liquid such as kerosene could possibly be used as such a light fluid instead.

Whilst the composite buoyancy pipe of the invention is preferably fully flooded by seawater upon installation and optionally partially flooded during lowering, a different heavy and possibly heavier-than-seawater fluid could be used for those purposes instead or in addition. Such a heavy fluid could comprise a particulate ballast material such as sand, gravel or cement. Alternatively the composite pipe could be weighed down externally with a suitable ballast.

Steel parts such as endpieces will require cathodic corrosion protection or alternatively may be in another material such as a polymer-based composite or a corrosion-resistant metal other than steel.

Many other variations are possible within the inventive concept. For example, either or both of the towheads may comprise equipment for subsea processing of production fluid before it flows up the riser. Thus, either or both of the towheads may serve as an integrated termination structure and processing system.

One or both of the towheads may, for example, comprise: drilling slots; connections to wellhead(s) or to production manifolds; equipment for water separation, removed water treatment and/or re-injection; cold-water circulation systems; and pigging facilities.

Distributing processing equipment between the towheads spreads the weight of the processing system and locates the processing equipment appropriately at the upstream or downstream end of the towable unit, when the unit is oriented for installation in a subsea production system.

Provision may be made to cool and heat flowline pipes of the bundle so as to control wax formation in production fluid flowing through those pipes, for example as may be required to enable 'cold flow' of wax particles entrained in the flow of the production fluid. For these purposes, one or both of the towheads may host a pump for pumping cooling water along the bundle and a heating system for applying heat to the bundle, for example by powering electrical heating elements that extend along one or more flowlines of the bundle.

The invention claimed is:

1. A towable pipeline bundle for installation underwater at a subsea oil or gas production site, the bundle comprising:
   two or more flowlines for carrying production fluid bundled in parallel relation;
   at least one rigid buoyancy pipe extending along and supporting said bundled flowlines, which buoyancy pipe has an internal buoyancy chamber and at least one port for introducing fluid into the buoyancy chamber;
   one or more spacer frames supporting and locating the flowlines relative to the buoyancy pipe and spacing each flowline from each other flowline, the or each spacer frame being attached to and extending transversely from or within the buoyancy pipe; and
   wherein the buoyancy pipe is of polymer-composite material and is arranged to have positive buoyancy in seawater when its buoyancy chamber contains a fluid less dense than seawater.

2. The bundle of claim 1, wherein at least one of the bundled flowlines has a pipe-in-pipe arrangement.

3. The bundle of claim 1 further comprising a power and/or data line for conveying power or data along the bundle.

4. The bundle of claim 1, wherein the buoyancy pipe surrounds the bundled flowlines as a carrier pipe.

5. The bundle of claim 4, wherein an endpiece, end wall or side wall of the buoyancy pipe is penetrated by the bundled flowlines within the buoyancy pipe or by connections leading to the bundled flowlines within the buoyancy pipe.

6. The bundle of claim 1, wherein the buoyancy pipe lies beside the bundled flowlines as a backbone pipe or a core pipe.

7. The bundle of claim 6, wherein the buoyancy pipe lies between the bundled flowlines as a core pipe.

8. The bundle of claim 1, wherein the buoyancy chamber contains pressurised air.

9. The bundle of claim 1, wherein at least one of said ports penetrates a side wall of the buoyancy pipe.

10. The bundle of claim 1, wherein at least one of said ports penetrates an endpiece that closes an end of the buoyancy pipe.

11. The bundle of claim 1, wherein the buoyancy pipe is terminated by at least one end wall of polymer-composite material that is integral with or bonded to a side wall of the buoyancy pipe.

12. A towable unit comprising a towable pipeline bundle for installation underwater at a subsea oil or gas production site, wherein the bundle is attached to at least one towhead, the bundle comprising:
   two or more flowlines for carrying production fluid bundled in parallel relation;
   at least one rigid buoyancy pipe extending along and supporting said bundled flowlines, which buoyancy pipe has an internal buoyancy chamber and at least one port for introducing fluid into the buoyancy chamber; and
   one or more spacer frames supporting and locating the flowlines relative to the buoyancy pipe and spacing each flowline from each other flowline, the or each spacer frame being attached to and extending transversely from or within the buoyancy pipe;

wherein the buoyancy pipe is of polymer-composite material and is arranged to have positive buoyancy in seawater when its buoyancy chamber contains a fluid less dense than seawater.

13. The unit of claim 12, wherein:
the buoyancy pipe is anchored to the towhead to provide a load path between the buoyancy pipe and the towhead; and
the bundled flowlines are decoupled from that load path.

14. A subsea installation comprising the bundle of claim 1.

15. A method of installing a towable pipeline unit underwater at a subsea oil or gas production site, the method comprising:
using a rigid polymer-composite buoyancy pipe of the unit to support bundled flowlines of the unit for carrying production fluid, each flowline being supported and located relative to the buoyancy pipe, and spaced from each other flowline, by one or more spacer frames attached to and extending transversely from or within the buoyancy pipe;
introducing a fluid less dense than seawater into an internal buoyancy chamber of the buoyancy pipe to confer substantially neutral buoyancy on the unit at a towing depth in seawater;
towing the unit to the production site at the towing depth; and
lowering the unit onto the seabed at the production site.

16. The method of claim 15 further comprising applying auxiliary buoyancy to one or more towheads at one or both ends of the buoyancy pipe.

17. The method of claim 15 further comprising lowering the unit to the seabed by replacing at least some of the fluid in the buoyancy chamber with a denser fluid.

18. The method of claim 17 further comprising fully or partially filling the buoyancy chamber with seawater or a heavier-than-seawater fluid or applying external ballast to the buoyancy pipe.

* * * * *